United States Patent
Brewer et al.

(10) Patent No.: US 6,786,551 B2
(45) Date of Patent: Sep. 7, 2004

(54) SEAT LATCHING ASSEMBLY

(75) Inventors: Michael J. Brewer, Rochester, MI (US); Eric G. Exner, Royal Oak, MI (US); Timothy S. Myers, Northville, MI (US)

(73) Assignee: Lear Corporation, Southfield, MI (US)

( * ) Notice: Subject to any disclaimer, the term of this patent is extended or adjusted under 35 U.S.C. 154(b) by 16 days.

(21) Appl. No.: 09/973,604

(22) Filed: Oct. 8, 2001

(65) Prior Publication Data

US 2003/0067203 A1 Apr. 10, 2003

(51) Int. Cl.$^7$ ................................................ B02C 2/02
(52) U.S. Cl. ........................... 297/378.12; 297/378.13; 297/476; 297/479
(58) Field of Search .............................. 280/801.2, 808; 297/378.13, 378.12, 474, 475, 476, 479, 483, 232; 296/65.16, 68.1

(56) References Cited

U.S. PATENT DOCUMENTS

| | | | | |
|---|---|---|---|---|
| 4,314,715 A | * | 2/1982 | Duguet et al. | ........... 280/801.1 |
| 4,456,196 A | * | 6/1984 | Takada et al. | .............. 242/385 |
| 4,475,763 A | | 10/1984 | Hamatani et al. | |
| 4,881,423 A | | 11/1989 | Traiano | |
| 5,582,453 A | * | 12/1996 | Leuchtmann et al. | .... 296/65.09 |
| 5,603,550 A | | 2/1997 | Holdampf et al. | |
| 5,658,048 A | * | 8/1997 | Nemoto | ....................... 297/410 |
| 5,662,369 A | | 9/1997 | Tsuge | |
| 5,758,919 A | | 6/1998 | Matheis | |
| 5,762,401 A | * | 6/1998 | Bernard | .................. 297/378.13 |
| 5,779,319 A | * | 7/1998 | Merrick | ....................... 297/484 |
| 5,829,831 A | * | 11/1998 | Sharman | ................ 297/378.12 |
| 6,045,194 A | | 4/2000 | Kielwein et al. | |
| 6,048,027 A | * | 4/2000 | Peck et al. | ................... 297/238 |
| 6,250,680 B1 | * | 6/2001 | Moker | ...................... 280/801.2 |
| 6,328,386 B1 | * | 12/2001 | Good | .......................... 297/483 |
| 6,341,820 B1 | * | 1/2002 | Kimura et al. | ......... 297/378.13 |
| 6,491,346 B1 | * | 12/2002 | Gupta et al. | ............ 297/452.65 |

* cited by examiner

Primary Examiner—Peter M. Cuomo
Assistant Examiner—Erika Garrett
(74) Attorney, Agent, or Firm—Bill C. Panagos

(57) ABSTRACT

A seat latching assembly for a vehicle includes a seatback having first and second sides. A first latch is provided for latching the first side of the seatback to a portion of a vehicle, the first latch being operable between a latched position and an unlatched position. A second latch is provided for latching the second side of the seatback to another portion of the vehicle, the second latch being operable between a latched position and an unlatched position. A mechanism is operatively connected to the first and second latches, and is movable between a locked position and an unlocked position. When one of the first and second latches is in the unlatched position, the mechanism is prevented from moving into the unlocked position, and when the first and second seat portions are both in their latched positions, the mechanism is permitted to be moved into the unlocked position.

16 Claims, 10 Drawing Sheets

US 6,786,551 B2

SEAT LATCHING ASSEMBLY

BACKGROUND OF THE INVENTION

The present invention relates to a seat latching assembly for a vehicle and more particularly to a seat latching assembly operative to lock and unlock a seat belt retractor.

It is also common in sedan or coupe type vehicles to provide the rear seat of the vehicle with a pair of seatbacks for access to the rear cargo area from the interior of the vehicle. The seatbacks can have equal widths or one of the seatbacks can have a width approximately equal to 60 percent of the total width of the rear seat, and the other seatback having a width approximately equal to 40 percent of the total width of the rear seat. This seat arrangement is commonly referred to as a 60-40 split bench folding seat. Each of the seatbacks has a latch to lock and unlock the seatback from its upright position.

Motor vehicles are also commonly equipped with seat belt restraint systems for physically restraining the seat occupant when the vehicle is subjected to a high rate of deceleration. Such rapid deceleration may occur, for example, during a motor vehicle collision or during severe braking. It is also known to equip motor vehicles with a seat belt restraint centrally located relative to the rear seat to physically restrain a vehicle occupant riding in the center of the rear seat.

Typical conventional seat latching systems include one set latch associated with the seat belt retractor. When the seat latch is unlatched, the seat belt retractor is inoperable so that an occupant will not inadvertently use the seat belt retractor when the seat is not properly latched, thereby possibly injuring the occupant.

SUMMARY OF THE INVENTION

The above object as well as other objects not specifically enumerated are achieved by a seat latching assembly for a vehicle. The seat latching assembly comprises a seatback having first and second sides. A first latch is provided for latching the first side of the seatback to a portion of a vehicle, the first latch being operable between a latched position and an unlatched position. A second latch is provided for latching the second side of the seatback to another portion of the vehicle, the second latch being operable between a latched position and an unlatched position. A mechanism is operatively connected to the first and second latches, and is movable between a locked position and an unlocked position. When one of the first and second latches is in the unlatched position, the mechanism is prevented from moving into the unlocked position, and when the first and second seat portions are both in their latched positions, the mechanism is permitted to be moved into the unlocked position.

Preferably, the mechanism is mechanically connected to one of the first and the second seat latches by an actuator. The actuator comprises a housing; a cable having a first end and a second end, the first end connected to one of the first and second seat latches; and a cam plate slidingly retained in the housing. A cam member has first and second ends, the first end of the cam member is adapted to connect to the second end of the cable, and the second end of the cam member is adapted to contact the cam plate. A pivotal mounting intermediate the first and second ends of the cam member mounts the cam member to the housing, wherein movement of the cable away from the housing causes the cam member to pivot about the pivotal mounting, and the second end of the cam member urges the cam plate upwardly. An actuating member is connected to the cam plate for moving the mechanism between the locked and the unlocked position.

Various objects and advantages of this invention will become apparent to those skilled in the art from the following detailed description of the preferred embodiment, when read in light of the accompanying drawings.

DETAILED DESCRIPTION OF THE INVENTION

Figure 1:
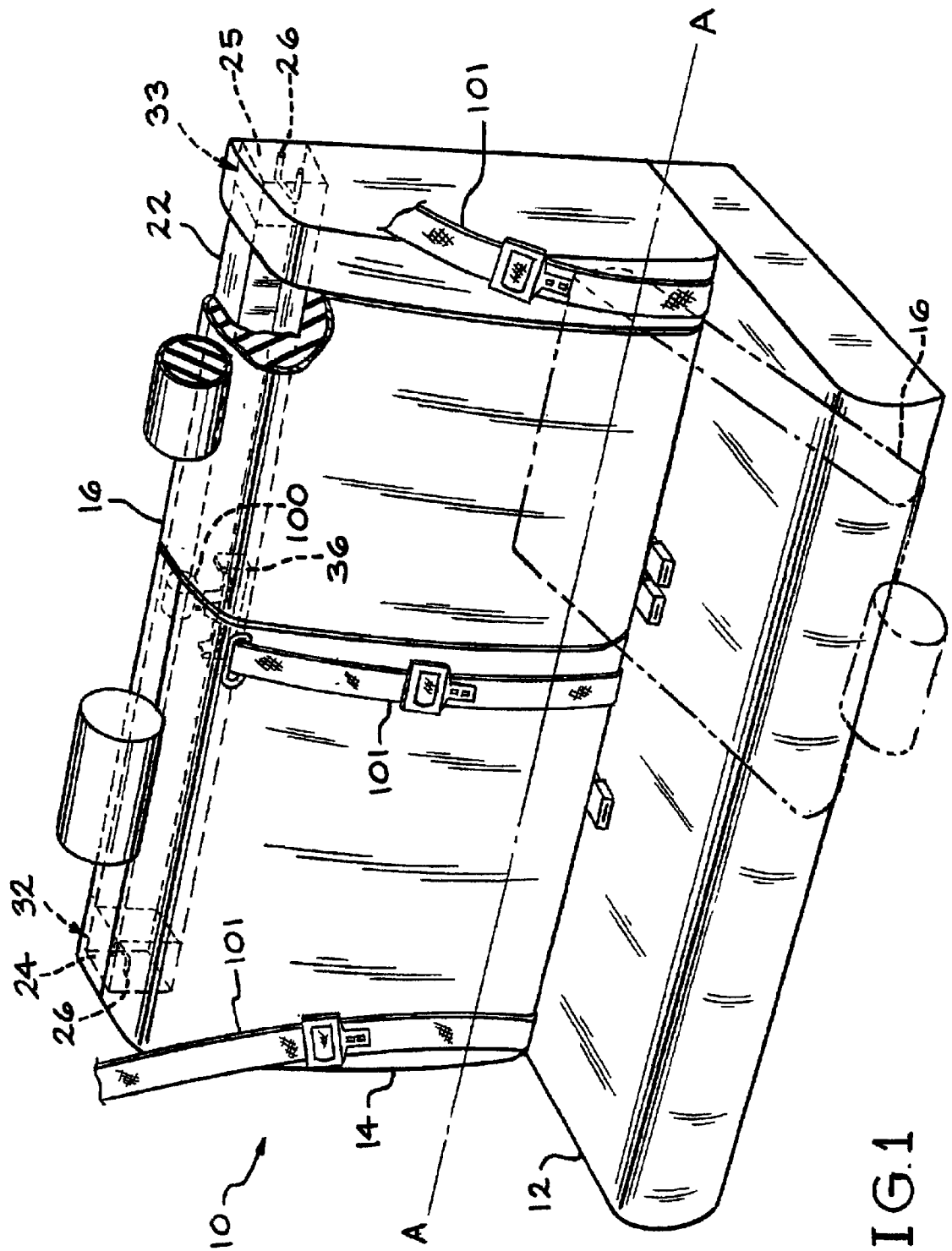
FIG. 1 is a partial perspective view of a rear seating area of a vehicle illustrating a rear seat incorporating a seat latching assembly of the invention.
Figure 2:
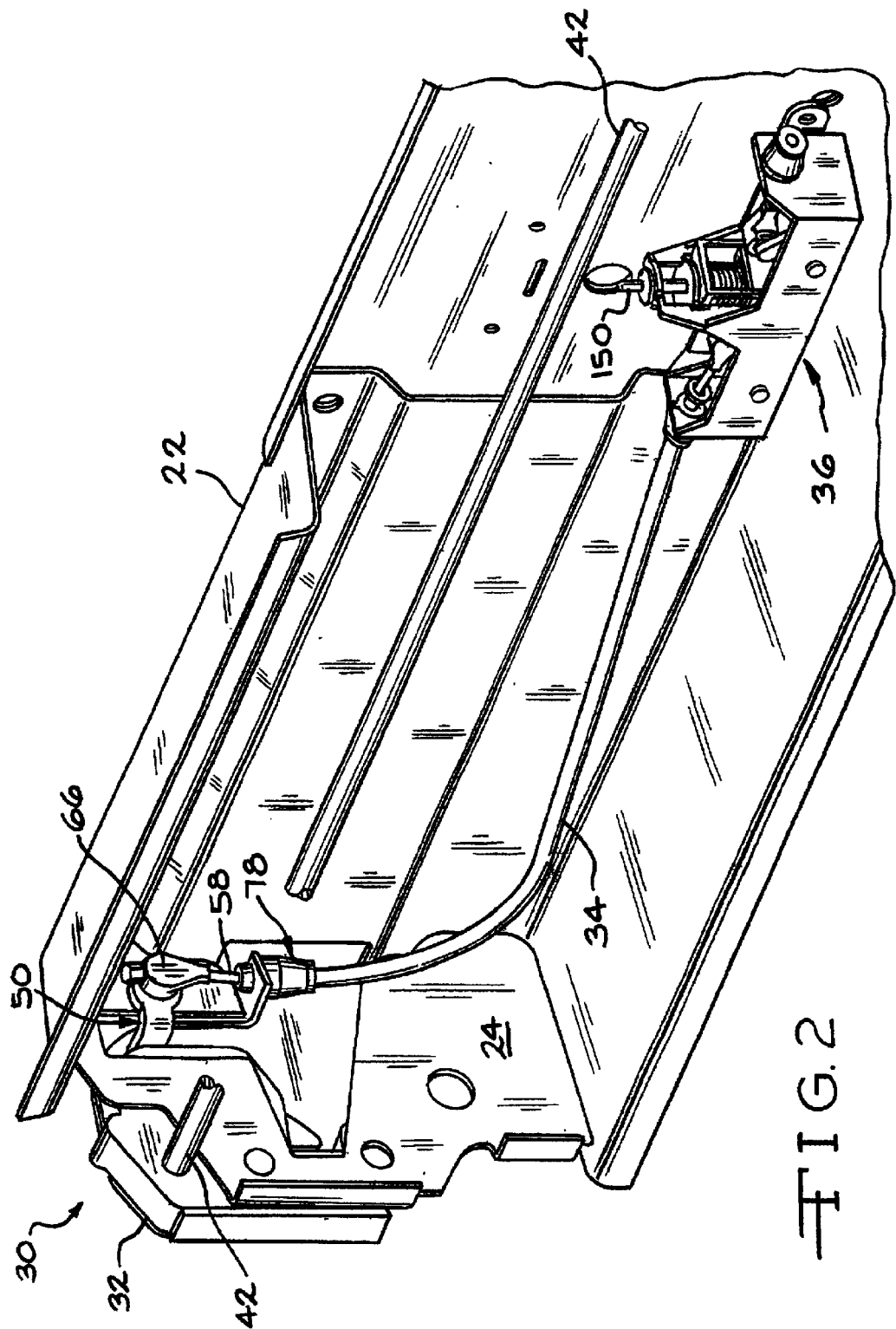
FIG. 2 is a perspective view of a portion of the seat latching assembly of the invention.

Referring now to the drawings, there is shown in FIGS. 1 and 2 a rear seat 10 for a passenger-type motor vehicle. The rear seat 10 is shown to include a seat cushion 12 and a seatback 14. The seatback 14 is mounted to a structural portion of the motor vehicle about pivot axis A, as shown in FIG. 1, for pivotal movement between an upright position and a forwardly folded position adjacent to seat cushion 12. In FIG. 1, the seatback 14 is illustrated latched in its upright or raised position. The seatback 14 includes a fold-down seatback portion or panel 16 that may be pivotally mounted to a structural portion of the vehicle or pivotally mounted to the seatback 14. In FIG. 1, the seatback panel 16 is illustrated in its raised position. Phantom lines illustrate the seatback panel 16 in its lowered position. Typically, the seatback 14 is installed in a rear seating area of the vehicle so as to be located forward of a cargo area or trunk storage area (not shown). Typically, the seatback panel 16 is an access panel which provides access to the storage area.

The seatback 14 further includes a mounting structure or cross beam 22 integrally attached to the seatback 14. The cross beam 22 is generally elongate having a generally C-shaped profile, and includes a right side mounting plate 24 and a left side mounting plate 25, transversely attached at the distal ends of the cross beam 22. The left and right ends of the cross beam 22 are attached to structural portions of the vehicle. The cross beam 22 provides structural support for the seatback 14 and accepts a force exerted by a seatbelt retractor 100 when a vehicle occupant is restrained in the rear seat by a seat belt 101. Inwardly extending generally U-shaped striker bars 26 are attached to a structural portion of the vehicle for releasable engagement with a right side seat latch 32 and a left side seat latch 33. It will be understood that the present invention is not limited to use with rear seat systems having only one fold-down seatback panel, as illustrated in FIG. 1, and may be used with rear seat systems having two or more fold-down seatback panels in which the cross beam 22 is attached to one of the two or more panels, or a rear seat system having no fold-down seatback panels.

Figure 3:
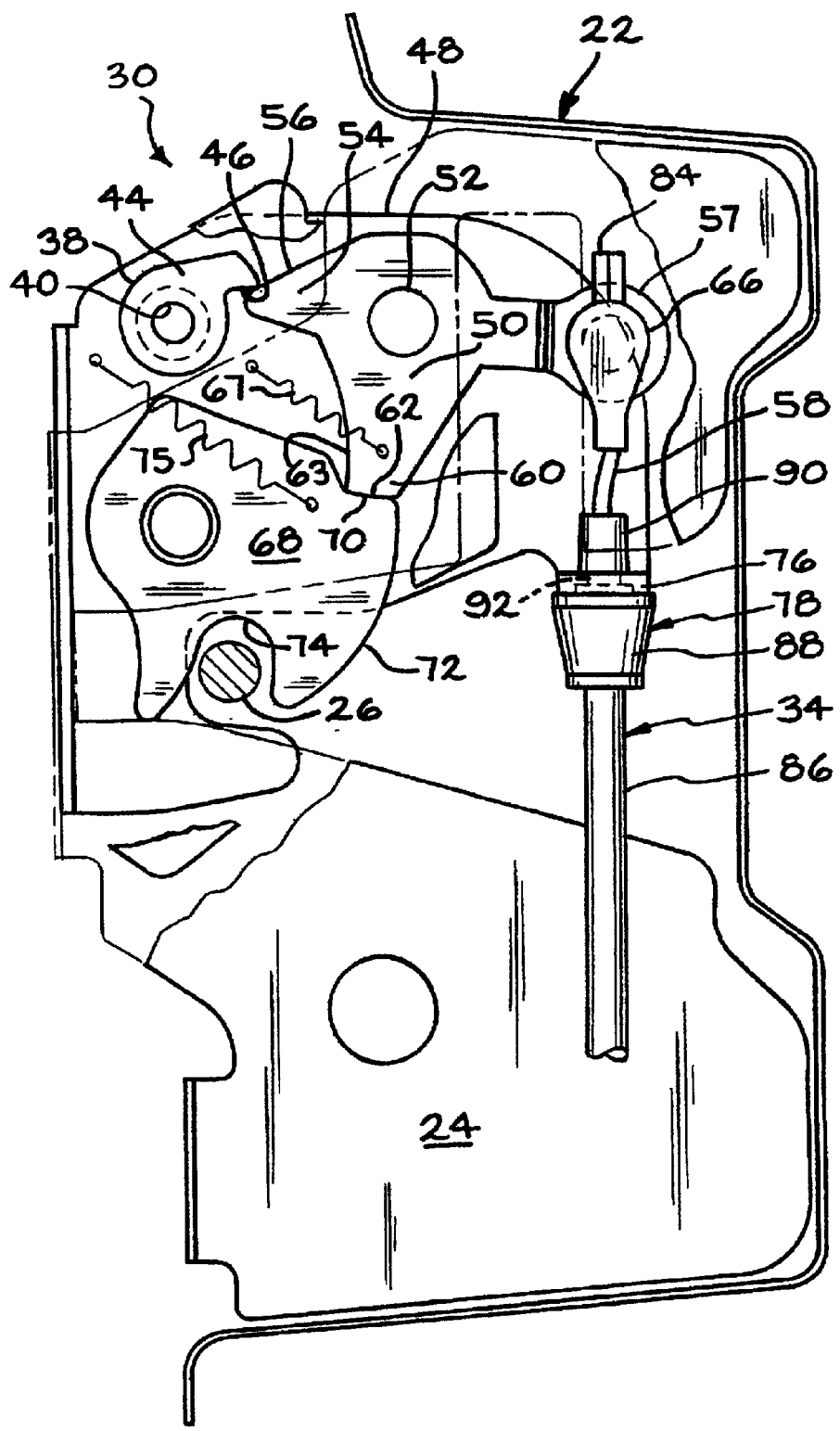
FIG. 3 is a side view of the right side seat latch illustrated in FIG. 2 in a latched position.
Figure 4:
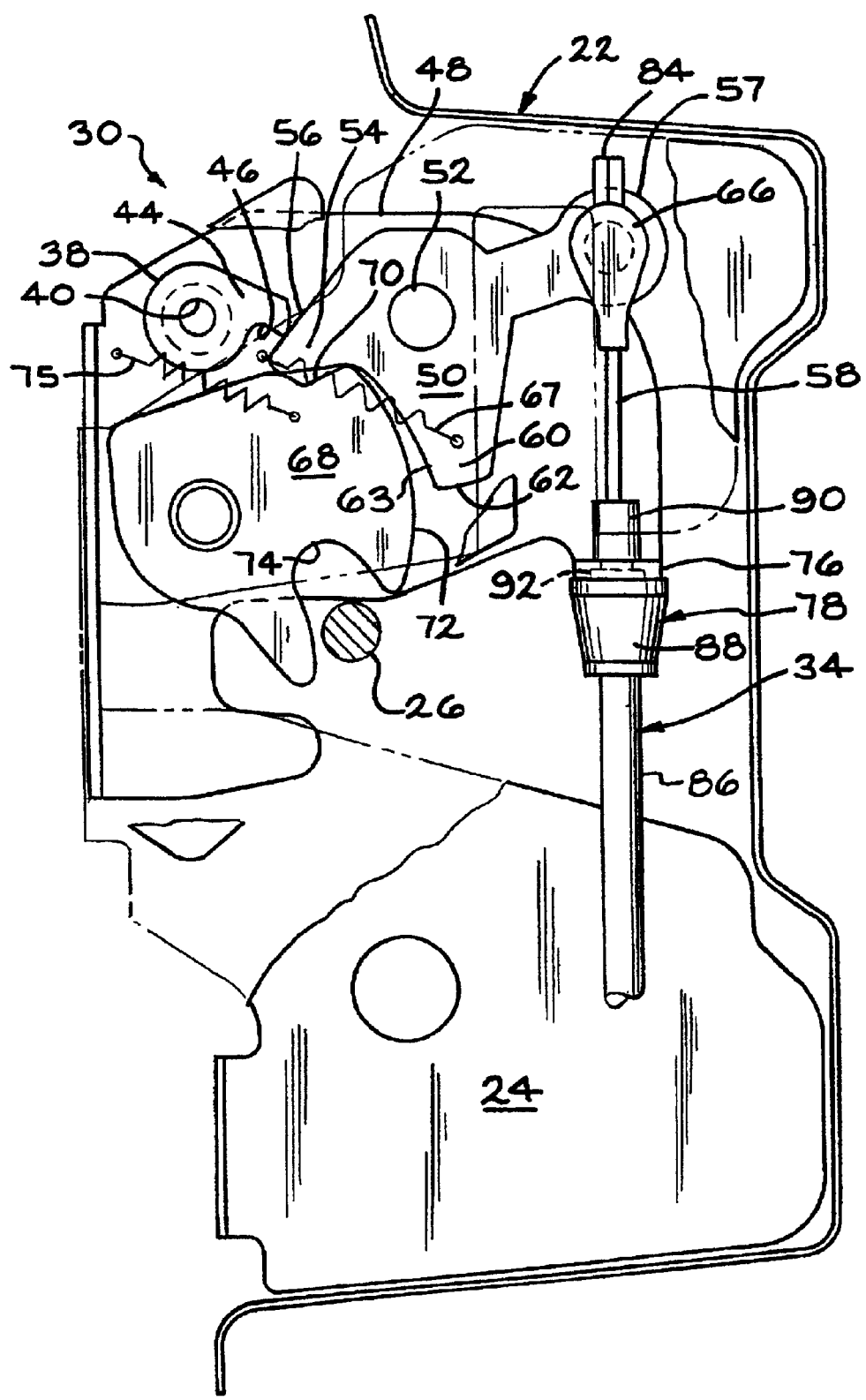
FIG. 4 is a side view of the right side seat latch illustrated in FIGS. 2 and 3 in an unlatched position.

Referring now to FIGS. 2 through 4, a seat latching assembly is illustrated generally at 30. The seat latching assembly 30 includes the cross beam 22, a right side seat latch 32 and left side seat latch 33 (not shown in FIG. 2), a cable assembly 34, and an actuator assembly 36. It will be understood that the right side seat latch 32 and left side seat latch 33 are similar in function and structure, and therefore only the right side seat latch 32 will be discussed in detail. The right side seat latch 32 includes a latch release cam 38 having an aperture 40 for receiving one end of a latch release rod 42, and a cam arm 44 having a camming surface 46. The latch release cam 38 and the latch release rod 42 are pivotally attached to a latch assembly mounting plate 48. The latch release rod 42 is further connected to right and left side manually-operable spring-biased release handles (not shown). The other end of the latch release rod 42 is attached to a latch release cam (not shown) of the left side seat latch 33. Manual or powered actuation of the release handle operates to pivot the latch release rod 42 and attached latch release cam 38, the season for which will be explained below.

Figure 5:
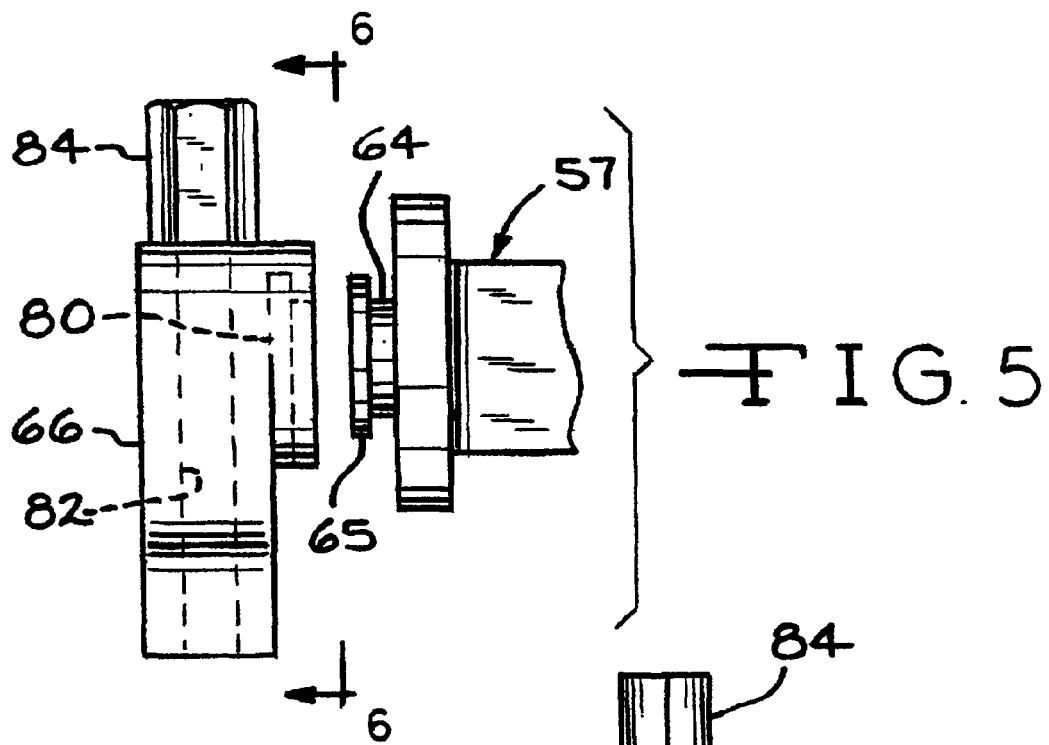
FIG. 5 is a partially exploded end view of the cable attachment arm of the locking pawl and the cable end fitting.
Figure 6:
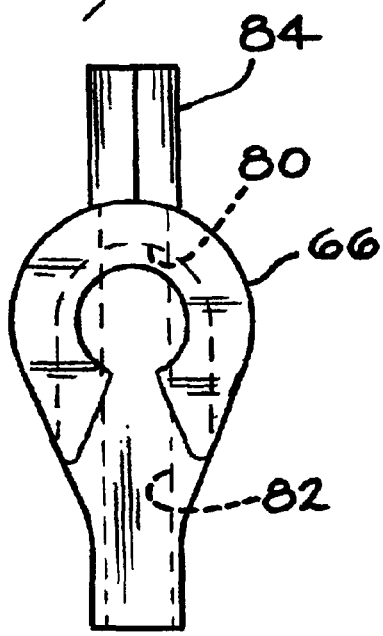
FIG. 6 is a side view of the cable end fitting taken along line 6—6 of FIG. 5.
Figure 7:
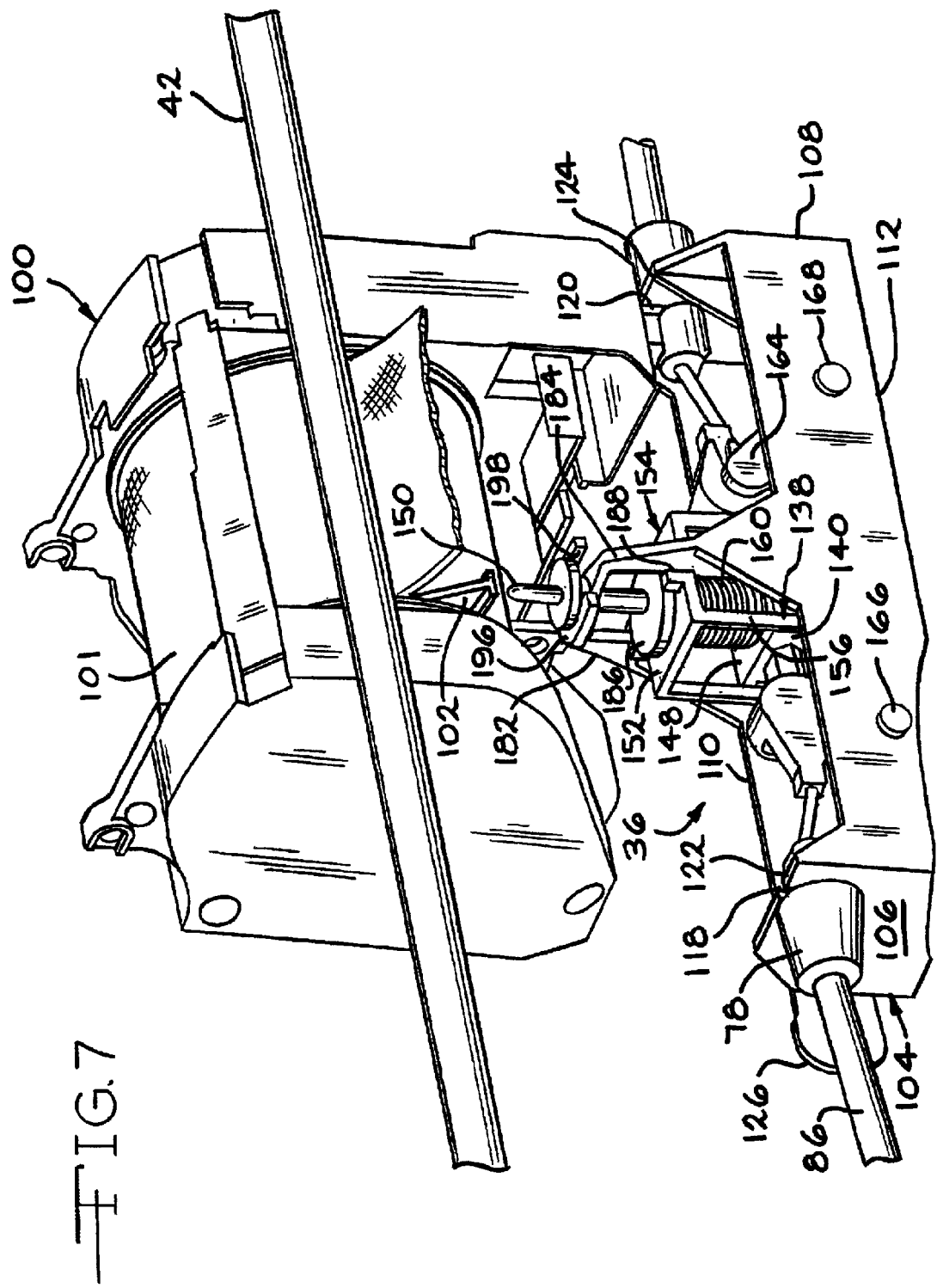
FIG. 7 is a perspective view of an actuator assembly and seat belt retractor.

A spring biased locking pawl 50 is pivotally attached to the mounting plate 48 through a pivot pin 52. The locking pawl 50 includes a first cam arm 54, a cable attachment arm 57, and a second cam arm 60. The fist cam arm 54 of the locking pawl 50 includes a first camming surface 56, and is arranged to cooperate with the cam arm 44 of the latch release cam 38. As shown in FIG. 5, the cable attachment arm 57 includes an outwardly extending generally cylindrical shaft 64 having a generally annular flange 65 at the distal end thereof for attaching a cable end fitting 66 of a cable 58 of the cable assembly 34. The second cam arm 60 includes a second camming surface 62 and a third camming surface 63. A biasing mechanism or spring 67 (schematically illustrated in FIGS. 3 and 4) normally biases the locking pawl 50 in a clockwise direction, as viewing FIG. 3, and toward the latch release cam 38.

A cam plate 68 is pivotally attached to the mounting plate 48 and includes a first camming surface 70 and second camming surface 72 which cooperate with the second cam arm 60 of the locking pawl 50, and a lock slot 74 for releasable engagement with the striker bar 26. A biasing mechanism or spring 75 (schematically illustrated in FIGS. 3 and 4) normally biases the cam plate 68 in a counterclockwise direction and toward the locking pawl 50, as viewing FIG. 3. Moreover, the biasing spring 75 of the cam plate 68 normally urges the cam plate 68 toward an unlatched position. The mounting plate 48 includes an arm 76 extending inwardly of the right side mounting plate 24. The arm 76 has a generally circular aperture (not shown) formed therein for receiving a conduit end fitting 78 of the cable assembly 34. The right side seat latch 32 is attached to the mounting plate 24 of the cross beam 22 by any suitable means such as threaded fasteners, rivets, or welding.

Referring now to FIGS. 2 through 7 the cable assembly is generally illustrated at 34. The cable assembly 34 includes cable end fitting 66 having a slot 80 for lockably receiving the flange 65 of the locking pawl 50. A longitudinal channel 82 is formed within the end fitting 66 for receiving the cable 58. A crimp 84 for attaching the cable 58 to the cable end fitting 66 is disposed adjacent the cable end fitting 66 opposite the cable 58. A conduit end fitting 78 is attached to opposite ends of a cable conduit 86. The cable conduit 86 slidably contains the cable 58. The conduit end fittings 78 include a collar portion 88, an expandable end portion 90, and a neck portion 92 between the collar portion 88 and the end portion 90. The neck portion 92 is adapted to be retained in the aperture of the arm 76 of the mounting plate 48, as illustrated in FIGS. 2 and 3. Of course, the cable assembly 34 can be any suitable arrangement for operatively engaging the actuator assembly 36.

Referring now to FIGS. 7 through 10, the actuator assembly is generally illustrated at 36. The actuator assembly 36 is shown mounted to the cross beam 22 for selectively locking and unlocking a mechanism. In the preferred embodiment, the mechanism is a seat belt retractor 100, but can be any suitable mechanism, which it is desirable to lock, such as, for example, an integrated child seat, mounted in the seatback 14. The actuator assembly 36 releasably maintains a seat belt 101 of the seat belt retractor 100 in a locked position when either one of the right side seat latch 32 and left side seat latch 33 are in an unlatched position. The seat belt 101 is wound about a spool (not shown) of the seat belt retractor 100. When both the right side seat latch 32 and left side seat latch 33 are in a latched position, the actuator assembly 36 maintains the belt of the seat belt retractor in an unlocked position. The seat belt retractor 100 can be a typical conventional seat belt retractor having an actuating arm 102 for selectively retracting and releasing the belt.

The actuator assembly 36 includes a generally rectangular housing 104 having opposing ends 106, 108 and sides 110, 112. Apertures (not shown) are formed in the opposing ends 106, 108 for lockably receiving the conduit end fittings 78. Slots 118, 120 are formed between the apertures and an upper edge 122, 124 of each end 106, 108 for removing the conduit end fitting 78 from the apertures 114, 116 by sliding the neck portion 92 of the conduit end fitting 78 through the slots 118, 120. Bosses or tabs 126, 128 extend outwardly from the sides 106, 108, respectively, of the housing 104. The housing 104 is preferably attached to the cross beam 22 by fasteners, such as a threaded fasteners, extending through apertures 130, 132 formed in each tab 126, 128, and into cooperation with corresponding apertures in the cross beam 22. Strengthening ribs 134 extend from the upper edges 122, 124 of the ends 106, 108 to a base 136 of the housing 104.

A plunger 138 is disposed centrally within the housing 104. The plunger 138 includes a generally rectangular body 140 and a generally rectangular base 144 defining a camming surface 146 at one end thereof. A generally rectangular flange 148 is formed at the end of the body 140 opposite the base 144. A generally cylindrical actuating member or rod 150 is attached to a body 152 of a cap 154. The cap 154 includes a plurality of legs 156 extending outwardly from the body 152, opposite the actuating rod 150. Each leg 156 has an inwardly extending lip 158 formed at the distal end thereof for engaging the flange 148 of the plunger 138. A spring 160, preferably a helical compression spring, is disposed within an opening in the flange 148 of the plunger 138, and between the legs 156 of the cap 154. The spring 160 urges the body 152 of the cap 154 away from the plunger 138 such that the flange 148 of the plunger 138 abuts the lips 158 of each leg 156 of the cap 154.

Generally V-shaped cams 162, 164 are pivotally attached to the housing 104 by pivot pins 166 and 168 through apertures 167 and 169 respectively. A first end 170, 172 of each cam 162, 164 is adapted to slidingly engage the camming surface 146 of the plunger 138. A second end 174, 176 of each cam 162, 164 is adapted for locking engagement with a cable end fitting 66 as previously described. The second ends 174, 176 of each cam 162, 164 include an outwardly extending generally cylindrical shaft 178. A generally annular flange 180 is formed at the distal end of the shaft 178 for pivotally attaching the cable end fitting 66.

Arms 182, 184 extend outwardly of the sides 110, 112 of the housing 104, opposite the base 136, and are adapted for sliding engagement with slots 186, 188 formed in the body 152 of the cap 154. A generally cylindrical collar 190, having generally annular flange 192 formed at one end thereof is attached to each arm 182, 184 centrally of the housing 104. The collar 190 includes an axial channel 194 adapted to slidingly receive the actuating rod 150. A cantilevered beam 196 is attached to the seat belt retractor 100 and extends outwardly from a surface of the seat belt retractor 100. A slot 198 is formed in the beam 196 and is adapted to lockingly receive the collar 190 of the housing 104.

Referring now to FIG. 3, the right side seat latch 32 is illustrated in its locked position. In operation, the actuation of the right side manually-operable spring-biased release handle operates to unlatch the right side seat latch 32 by rotating the latch release rod 42 and the attached latch release cam 38, in a clockwise direction as viewing FIG. 3. In a similar fashion, the actuation of the left side release handle operates to unlatch the left side seat latch by rotating the latch release rod 42 and the corresponding latch release cam of the left side seat latch. It will be understood that the right and left side seat latches may be unlatched by actuation of the right and left side release handles, respectively, or both right and left side seat latches may be unlatched by actuation of either the right or the left side release handles.

Rotation of the latch release rod 42 in a clockwise direction, as viewing FIG. 3, causes the camming surface 46 of the cam arm 44 of the latch release cam 38 to slidingly engage the first cam arm 54 of the locking pawl 50, thereby forcibly rotating the locking pawl 50 in a counterclockwise direction against the force of its biasing spring 67. The counterclockwise rotation of the locking pawl 50 causes the second camming surface 62 of the second cam arm 60 to slidingly engage the first camming surface 70 of the cam plate 68, and the third camming surface 63 of the of the second cam arm 60 to slidingly engage the second camming surface 72 of the cam plate 68, thus permitting the biasing spring 75 of the cam plate 68 to move the cam plate 68 in a counterclockwise direction toward its unlatched position. FIG. 4 illustrates the right side seat latch 32 in its unlatched position.

When the cam plate 68 is rotated to its fully unlatched position as shown in FIG. 4, the striker bar 26 is released from the lock slot 74 of the cam plate 68, allowing the seatback 14 to be moved to a folded position. It will be understood that "fully unlatched" generally means that the locking pawl 50 has rotated in a counterclockwise direction until the first camming surface 70 of the cam plate 68 is in contact with the first camming arm 54 of the locking pawl 50, as viewing FIG. 4, thereby releasing the striker bar 26 from the lock slot 74.

Figure 8:
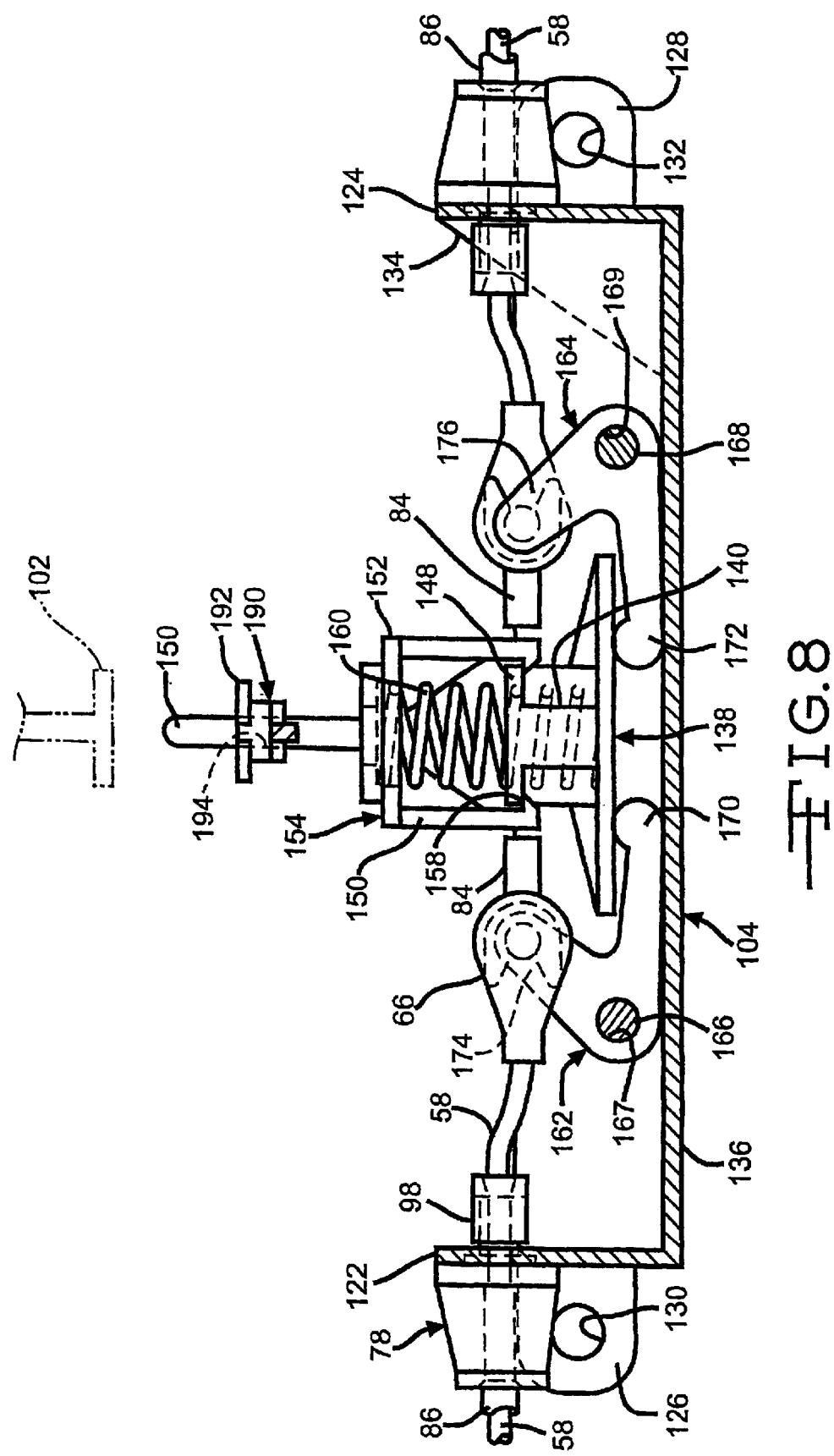
FIG. 8 is a front view of the actuator assembly illustrated in FIG. 7 in an unlocked position.
Figure 9:
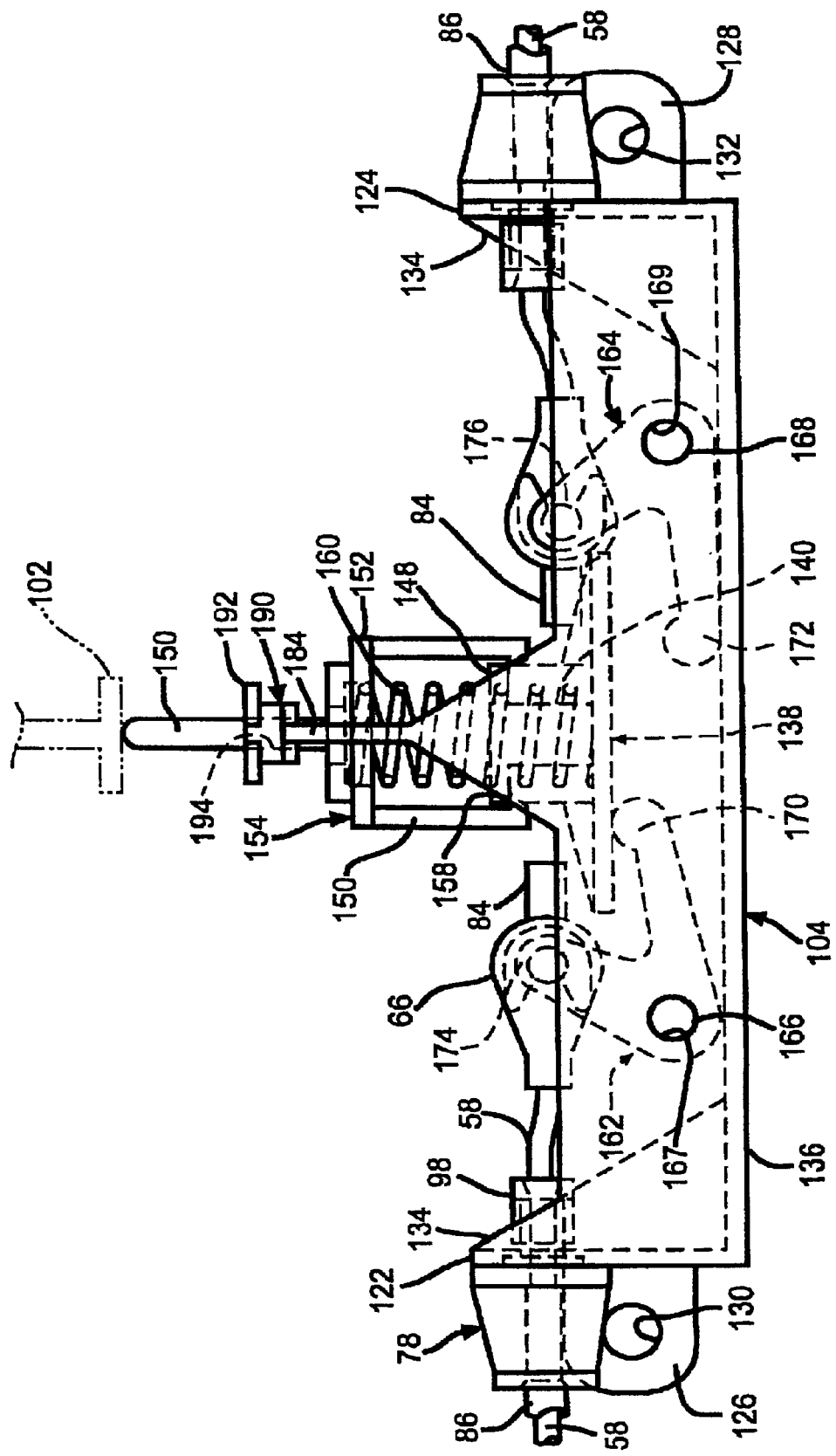
FIG. 9 is a front view of the actuator assembly illustrated in FIG. 7 showing the actuator assembly in a locked position.
Figure 10:
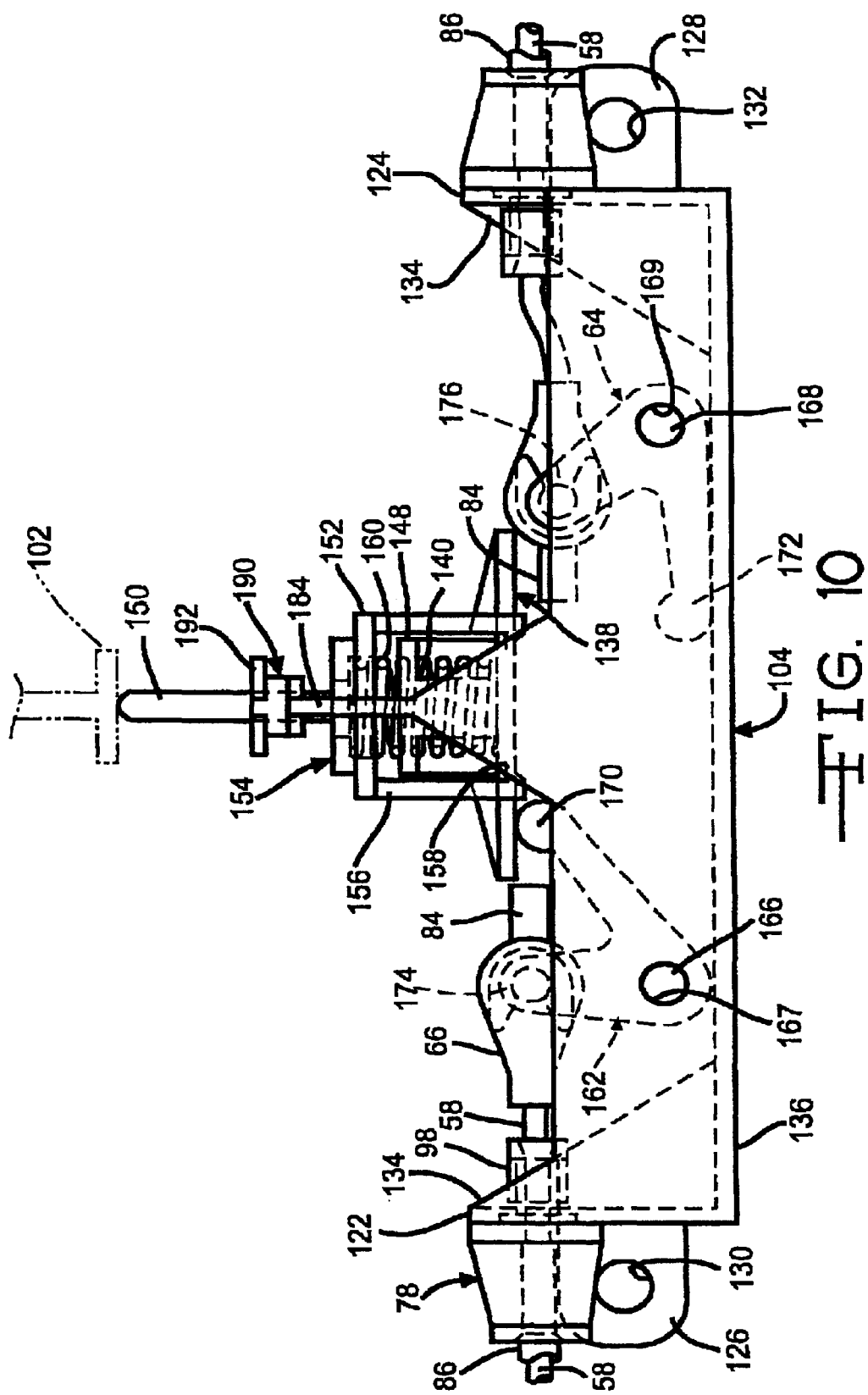
FIG. 10 is a front view of the actuator assembly illustrated in FIG. 7 showing the actuator assembly in a locked position.
Figure 11:
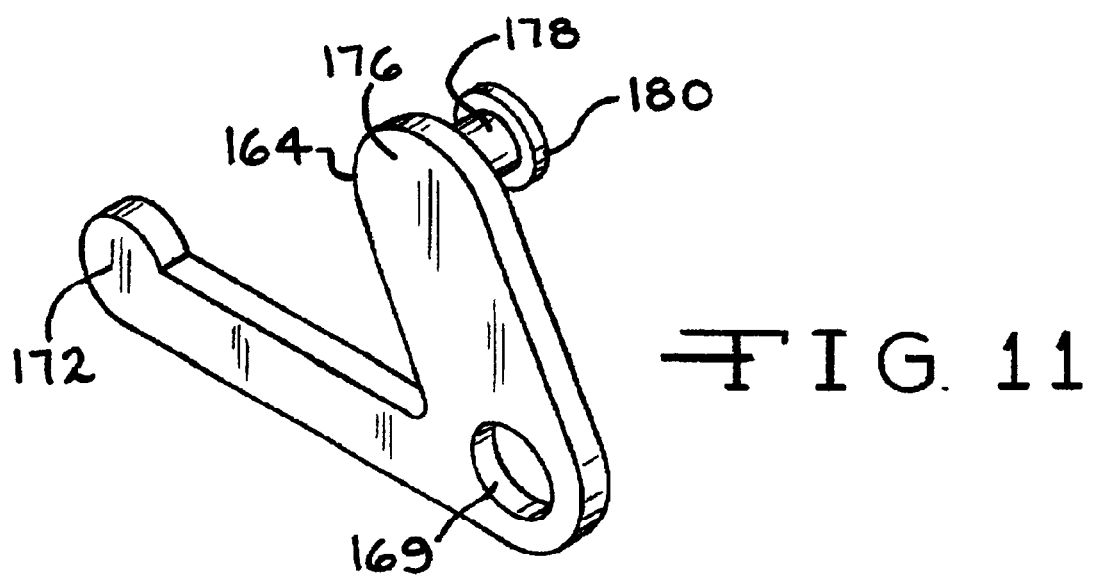
FIG. 11 is a perspective view of the cam illustrated in FIGS. 8 through 10.

The counterclockwise rotation of the locking pawl 50 further operates to move the cable 58 which, in turn, causes the cam 162 to pivot about pivot pin 166 in a counterclockwise direction as viewing FIGS. 8 through 10. As the cam 162 pivots about pivot pin 166, the first end 170 of the cam 162 slidingly engages the camming surface 146 of the plunger 138, thereby causing the slots 186, 188 of the cap 154 to slide along the arms 182, 184 of the housing 104, and urging the plunger 138 and the cap upward. When the rod 150 contacts the actuating arm 102 of the seat belt retractor 100 a force is exerted on the actuating arm 102, thereby urging the actuating arm 102 upwardly, locking the seat belt retractor 100, and preventing further movement of the actuation arm 102.

The cam 162 continues to pivot about the pivot pin 166 until the seat latch 32 is in its unlatched position, as illustrated in FIG. 4, and the actuator assembly 36 is in a fully locked position as illustrated in FIG. 10. It will be understood that fully locked generally means that the actuating arm 102 has been urged a sufficient distance to lock the seat belt retractor 100 so that the seat belt 101 cannot be dispensed from the spool of the seat belt retractor 100. Because the actuator arm 102 is prevented from further upward movement, the rotation of the cam 102 urges the plunger 138 against the force of the spring 160, thereby compressing the spring 160 and moving flange 148 of the plunger 138 away from the lips 158 of the legs 156 toward the body 152 of the cap 154, as illustrated in FIG. 10.

An important aspect of the invention is that the seat belt retractor 100 is moved to its locked position after only a small force is exerted on the actuating arm 102 by the actuating rod 150, and well before either the right side seat latch 32 or the left seat latch is fully unlatched, as shown in FIG. 4. The force required to lock the seat belt retractor 100 is exerted on the actuating arm 102 after the actuating rod 150 is caused to travel only a short distance, such as from about 4 to about 6 millimeters, as illustrated in FIG. 9.

Another important aspect of the invention, as clearly illustrated in FIGS. 8 through 10, is that the seat belt retractor 100 is locked when only one of the right side seat latch 32 and the left side seat latch 33 is in the unlocked position. Pivotal movement of only one of the cams 162 and 164 is sufficient urge the plunger 138, cap 154, and actuating rod 150 upward, thereby exerting a force on the actuating arm 102 of the seat belt retractor 100 and locking the retractor 100. Although operation of the right side seat latch 32 and pivotal movement of cam 162 is illustrated, it will be understood that operation of the left side seat latch 33 and pivotal movement of cam 164, or simultaneous operation of the right side seat latch 32 and the left side seat latch 33 will be sufficient to urge the plunger 138, cap 154, and actuating rod 150 upward, thereby locking the seat belt retractor 100.

As the seatback 14 is moved upward toward an upright position, the striker bar 26 engages the lock slot 74 of the cam plate 68, causing the cam plate 68 to rotate in a clockwise direction toward its latched position as viewing FIG. 3. The striker bar 26 is then retained within the lock slot 74, thereby preventing movement of the seatback 14 from its upright position. As the cam plate 68 rotates clockwise, the biasing spring 67 of the locking pawl 50 urges the locking pawl 50 in a clockwise direction, thereby moving the cable 58 toward the housing 104. The movement of the cable 58 toward the housing 104 pivots the cam 162 in a clockwise direction, lowering the plunger 138, cap 145, and actuating rod 150, thereby removing the force from the actuating arm 102 and unlocking the seat belt retractor 100.

Although the invention is described in the context of a seat latching assembly which selectively locks and unlocks a seat belt retractor, it is to be understood that the method of the invention can be used for seat latching assemblies which selectively lock and unlock other mechanisms, such as, for example child safety seats.

Additionally, although the invention is described in the context of a seat latch operatively connected to an actuator assembly by means of a cable, it is to be further understood that satisfactory results may be achieved by a seat latch operatively connected to the actuator by means other than a cable. For example, the seat latch may be operatively connected to the actuator by a rigid rod or shaft.

The principle and mode of operation of this invention have been described in its preferred embodiments. However, it should be noted that this invention may be practiced otherwise than as specifically illustrated and described without departing from its scope.

What is claimed is:

1. A seat latching assembly for a vehicle comprising:
    a seatback having first and second sides;
    a first latch for latching said first side of said seatback to a portion of a vehicle, said first latch operable between a latched position and an unlatched position;
    a second latch for latching said second side of said seatback to another portion of the vehicle, said second latch operable between a latched position and an unlatched position; and
    a mechanism operatively connected to said first and second latches, said mechanism movable between a locked position and an unlocked position, wherein when one of said first and second latches is in said unlatched position, said mechanism is prevented from moving into said unlocked position, and wherein when said first and second seat portions are both in their latched positions, said mechanism is permitted to be moved into said unlocked position
    wherein said mechanism includes an actuating member movable between first and second positions corresponding to the locked and unlocked positions of said mechanism, said actuator member operatively connected to both said first and second latches.

2. The seat latching assembly of claim 1, said seatback including a cross beam extending between said first and second sides.

3. The seat latching assembly of claim 2, wherein said mechanism is fastened to said cross beam.

4. The seat latching assembly of claim 3, wherein said mechanism is a seat belt retractor.

5. The seat latching assembly of claim 3, wherein said mechanism is a child seat.

6. The seat latching assembly of claim 1, wherein said seatback includes first and second seating positions.

7. The seat latching assembly of claim 6, said seatback being movable between a raised position and a lowered position.

8. The seat latching assembly of claim 6, said seatback having a seatback portion, said seatback portion being movable between a raised position and a lowered position.

9. The seat latching assembly of claim 8, said seatback portion having a latch mechanism for latching said seatback portion to said seatback in said raised position.

10. The seat latching assembly of claim 1, wherein said mechanism is mechanically connected to one of said first and second seat latches by an actuator.

11. The seat latching assembly of claim 1, wherein said mechanism is mechanically connected to said first seat latch by a first actuator, and mechanically connected to said second seat latch by a second actuator.

12. The seat latching assembly of claim 10, wherein said actuator comprises:
    a housing;
    a cable having a first end and a second end, the first end connected to one of said first and second seat latches;
    a cam plate slidingly retained in said housing;
    a cam member having first and second ends, the first end of said cam member adapted to connect to the second end of said cable, and the second end of said cam member adapted to contact said cam plate;
    a pivotal mounting intermediate the first and second ends of said cam member for mounting said cam member to said housing, wherein movement of said cable causes said cam member to pivot about said pivotal mounting, the second end of said cam member urging said cam plate in a first direction; and
    an actuating member connected to said cam plate for moving said mechanism between the locked and the unlocked position.

13. The seat latching assembly of claim 11, wherein each of said first actuator and said second actuator comprise:
    a housing;
    a cable having a first end and a second end, the first end connected to one of said first and second seat latches;
    a cam plate slidingly retained in said housing;
    a cam member having first and second ends, the first end of said cam member adapted to connect to the second end of said cable, and the second end of said cam member adapted to contact said cam plate;
    a pivotal mounting intermediate the first and second ends of said cam member for mounting said cam member to said housing, wherein movement of said cable causes said cam member to pivot about said pivotal mounting, the second end of said cam member urging said cam plate in a first direction; and
    an actuating member connected to said cam plate for moving said mechanism between the locked and the unlocked position.

14. The seat latching assembly of claim 4, wherein said seat belt retractor includes a locked position wherein the belt of said seat belt retractor cannot be retracted and released, and an unlocked position wherein the belt of said seat belt retractor can be retracted and released.

15. The seat latching assembly of claim 12, wherein the one of said first and said second seat latches comprise:
    a mounting plate secured to a mounting structure of a vehicle;
    a latch release cam pivotally mounted to said mounting plate, and having a cam arm, said latch release cam moveable between a latched and an unlatched position;
    a locking pawl pivotally mounted to said mounting plate, and having a first cam arm for engaging the cam arm of said latch release cam, a cable attachment arm for attaching the first end of said cable, and a second cam arm, wherein movement of said latch release cam from a latched position to an unlatched position causes said locking pawl to pivot, and said cable to move in a second direction;
    a striker member secured to a structural portion of a vehicle; and
    a cam plate pivotally mounted to said mounting plate, said cam plate having a camming surface for engaging the second cam arm of said locking pawl, and a lock slot for releasable engagement with said striker member, said cam plate having a locked position whereby said striker member is lockingly retained by the lock slot of said cam plate, and an unlocked position whereby said striker member is released from the lock slot of said cam plate.

16. The seat latching assembly of claim 13, wherein each of said first and said second seat latches comprise:

a mounting plate secured to a mounting structure of a vehicle;

a latch release cam pivotally mounted to said mounting plate, and having a cam arm, said latch release cam moveable between a latched and an unlatched position;

a locking pawl pivotally mounted to said mounting plate, and having a first cam arm for engaging the cam arm of said latch release cam, a cable attachment arm for attaching the first end of said cable, and a second cam arm, wherein movement of said latch release cam from a latched position to an unlatched position causes said locking pawl to pivot, and said cable to move in a second direction;

a striker member secured to a structural portion of a vehicle; and a cam plate pivotally mounted to said mounting plate, said cam plate having a camming surface for engaging the second cam arm of said locking pawl, and a lock slot for releasable engagement with said striker member, said cam plate having a locked position whereby said striker member is lockingly retained by the lock slot of said cam plate, and an unlocked position whereby said striker member is released from the lock slot of said cam plate.

* * * * *